INVENTORS
EDWIN E. MALLORY AND
JOHN W. WHITE
BY
Oberlin + Limbach
ATTORNEYS.

March 14, 1950  E. E. MALLORY ET AL  2,500,193
BEAD SETTING AND UNDERPLY FLARING DEVICE
Filed July 10, 1947 3 Sheets-Sheet 3

INVENTORS
EDWIN E. MALLORY AND
JOHN W. WHITE
BY Oberlin & Limbach
ATTORNEYS.

UNITED STATES PATENT OFFICE 2,500,193

BEAD SETTING AND UNDERPLY FLARING DEVICE

Edwin E. Mallory, Cuyahoga Falls, and John W. White, Wadsworth, Ohio, assignors to National Rubber Machinery Company, Akron, Ohio, a corporation of Ohio Application July 10, 1947, Serial No. 760,084

19 Claims. (Cl. 154—9)

This invention relates to a bead setting and underply flaring device for tire building machines.

One of the principal objects of the present invention is to provide a bead setting and underply flaring device which is operative upon movement to one position to apply a bead onto the underply of a tire carcass on a tire building drum during rotation of the drum and upon retraction from said position to release itself from the applied bead and flare the underply on the drum radially outwardly of the drum during continued rotation of the drum.

Another object is to provide a pair of devices of the character described which are operatively interconnected so as to move concurrently into and out of cooperative relation with opposite ends respectively of a rotating tire building drum.

Another object is to control accurately the movement of the devices relative to the drum and to each other so that they engage the opposite ends of the drum simultaneously.

A more specific object is to provide an underply flaring device which is arranged to be moved into the open end of the rotating drum, caused to rotate therewith by frictional driving engagement between the drum and the supporting means for the ply flaring device, to be withdrawn from the drum during rotation of the drum, and then to continue to rotate at a gradually decreasing speed so as to effect a wiping action on the inner surface of the underply endwise, circumferentially, and radially, of the drum concurrently during retraction of the device.

Another object is to provide a plurality of underply flaring shoes which are operated by centrifugal force to engage and flare the underply.

Other objects and advantages will become apparent from the following description wherein reference is made to the drawings in which.

Figure 1:
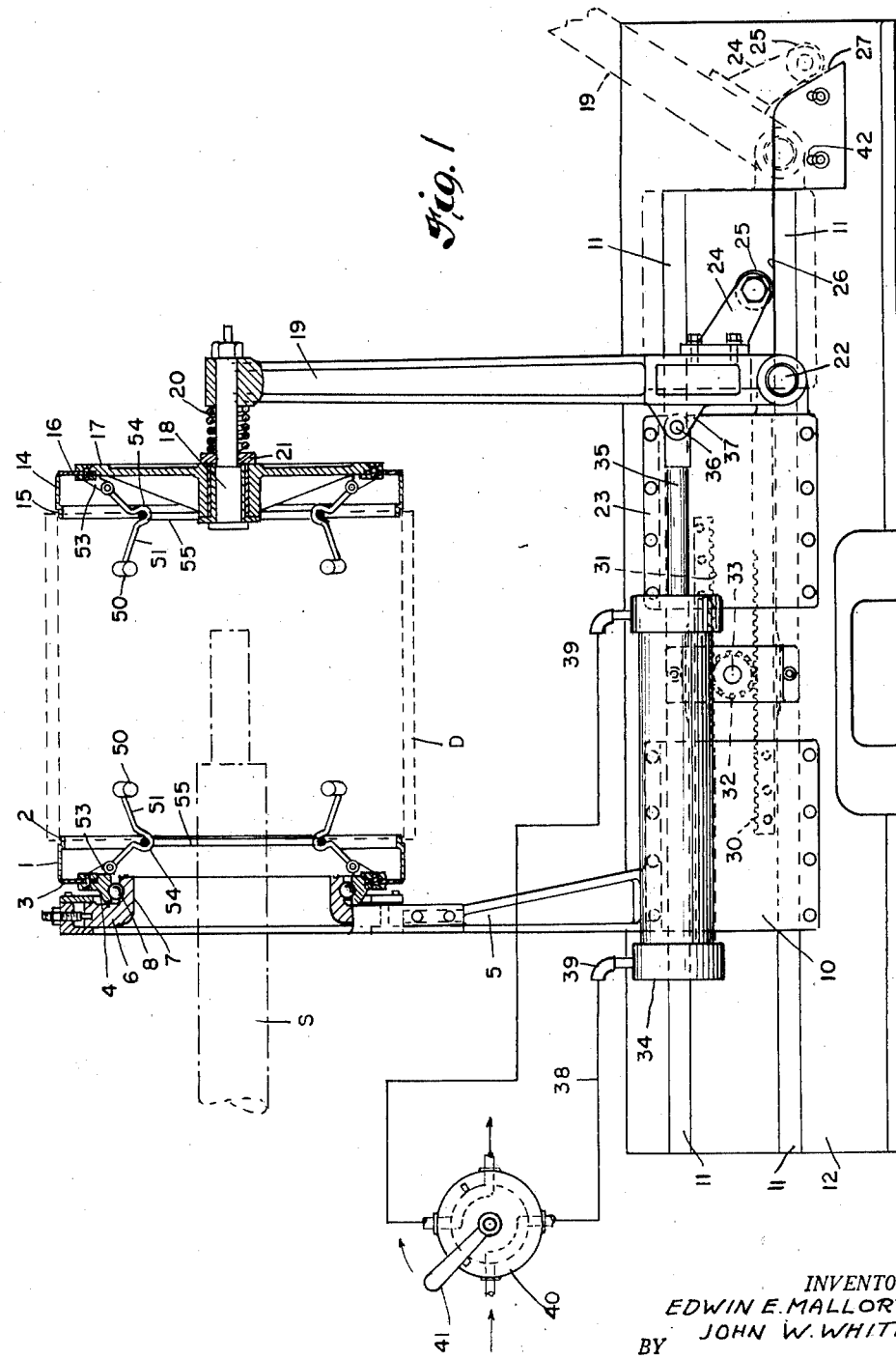
Fig. 1 is a front elevation of a bead setting and underply flaring device embodying the present invention and shown in association with a rotatable tire building drum.
Figure 2:
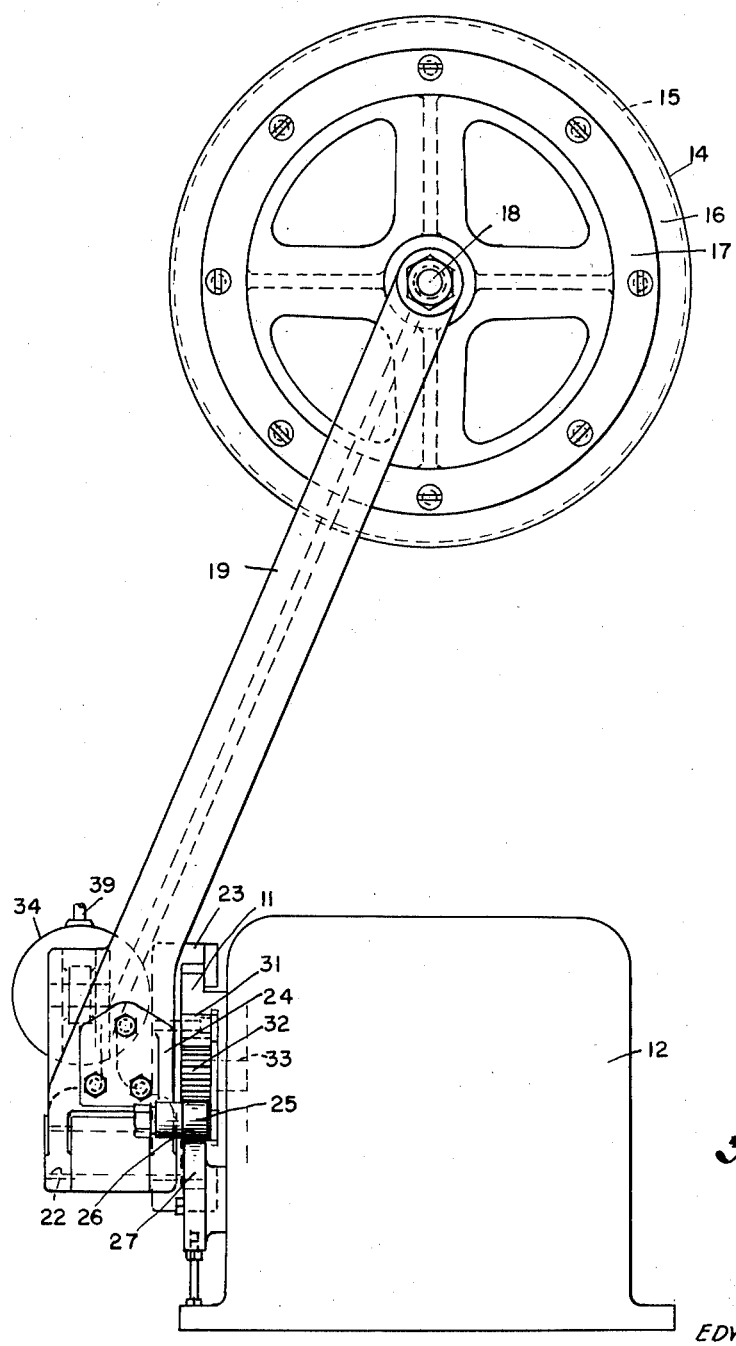
Fig. 2 is an enlarged side elevation of the device illustrated in Fig. 1, the drum being omitted for clearness in illustration.

Referring particularly to Fig. 1, the device is shown in association with a tire building drum D which may be of the usual type which is open at both ends and which is supported on and for rotation with a horizontal rotatable driving shaft S. For convenience in description, the right hand one of the devices illustrated in Fig. 1 is referred to as the outboard bead setting and ply flaring device and the left hand one in Fig. 1 is referred to as the inboard device.

The inboard device comprises a bead setting element or ring 1 having at one end an annular shoulder 2 of reduced diameter which is adapted to accommodate exteriorly an annular bead, with the usual attached flipper strip which is to be applied to a tire carcass on the drum D. The shoulder 2 is so positioned that when the bead and flipper strip to be applied to the drum are accommodated thereon and the ring is moved toward the inboard end of the drum to operating position while held in coaxial relation therewith, the bead engages the outer surface of the underply fabric on the end of the drum in the proper position.

In order to support the ring 1 for rotation in coaxial relation to the drum and for movement axially and under sufficient pressure to cause the bead to adhere to the underply, into a position to apply the annular bead carried on the shoulder 2, the ring is mounted fixedly on an annular carrier 3 which at its inner periphery is provided with a bearing race 4. An upright supporting arm 5 is mounted on the frame of the mechanism, as will later be described, and carried at its upper end a collar 6 having an annular hub 7 in the form of a bearing race complementary to the race 4. Suitable ball bearings 8 are interposed between the race 4 and hub 7 for anti-frictionally supporting the carrier 3 on the collar 6. The supporting arm 5 is fixedly secured in upright position on a suitable slide 10 which is mounted for movement endwise of, and parallel of the axis of, the drum in suitable slide-ways 11 formed on the supporting frame 12. The ring 1 is supported in this manner so as to be at all times coaxial with the drum D.

The outboard ring 14 is the same in form and function as the ring 1 and is provided with a shoulder 15 corresponding in form and function with the shoulder 2. The ring 14 has a radial flange 16 by which it is secured to a suitable spider or carrier 17. The carrier 17, in turn, is mounted for free rotation on a stub shaft 18 carried on the upper end of a supporting arm 19. The carrier 17 is slidable axially on the shaft 18 but is urged endwise of the shaft 18 away from the arm 19 by a suitable compression spring 20 which is operatively interposed between the outboard face of the carrier 17 and the inboard face of the arm 19.

The arm 19 is arranged to support the ring 14 normally in a position coaxial with the drum and adjacent the outboard end of the drum. The arm 19 is mounted, by means of a pivot 22, on a slide 23 which, in turn, is mounted for movement endwise of the drum and parallel to the drum axis in the slide-ways 11 of the frame 12. On the arm 19, near its base, is a bracket 24 which carries at its outer end a cam roller or follower 25. A came track having a horizontal portion 26 and a downwardly sloping portion 27 are fastened to the frame of the machine and are engaged by the cam roller 25 for maintaining the arm in proper upright position and for controlling its swinging movement about the pivot 22.

By virtue of the engagement of the roller 25 with the track portion 26, the arm 19 is maintained in an upright position wherein the bead ring 14 is coaxial with the drum. As the slide 23 is moved in the outboard direction relative to the drum, the roller 25 passes on to the sloping portion 27 of the cam track, thus permitting the arm 19 to swing in the outboard direction about the pivot 22 while constraining the movement of the arm to a pre-determined path of travel.

As mentioned in the objects, it is desirable that the arms 5 and 19, and therefore the rings 1 and 14, move in a predetermined relation to each other so that they engage the opposite ends of the drum simultaneously and are retracted therefrom simultaneously. It is also desirable that the ring 14 and arm 19 be movable to a position affording access to the outboard end of the drum to permit easy removal of the tire carcass from the drum. The latter movement is afforded by the cooperation of the cam follower 25 with the sloping portion 27 of the cam track. In order to effect all of these movements in proper relation, the slides 10 and 23 are interconnected mechanically. For this purpose, a suitable rack 30 is secured to the slide 10 and extends parallel to the slide-ways 11 toward the outboard end of the drum. A similar rack 31 is rigidly secured to the slide 23 and extends parallel to the slideways 11 and toward the inboard end of the drum. A pinion 32 is mounted on a suitable stub shaft 33 which is fixedly secured to the frame 12 and rotatably supports the pinion 32 in operative engagement with both of the racks 30 and 31, thus interlocking them mechanically. Since the racks engage the pinion 32 at diametrically opposite sides from each other, the racks 30 and 31 are constrained to move concurrently relatively apart and concurrently relatively together the same distances, respectively, toward and away from their starting positions.

In order to move the arms relatively together and apart and also to swing the arm 19 to a position out of alignment with the outboard end of the drum after the rings have been moved to fully retracted position, a suitable two-way cylinder and piston assemblage is provided. In the form illustrated, the cylinder 34 is secured in fixed position to the frame 12 with its axis parallel to the slide-ways 11. The cylinder 34 carries a suitable piston having a piston rod 35 which is pivotally connected by a pivot 36 to a yoke 37 which is rigid with the arm 19. From the foregoing it is obvious that there must be sufficient looseness or lost motion at the pivotal connection between the piston rod 35 and the swinging arm 19 to permit the aforesaid swinging of said arm between the dotted and solid line positions in Fig. 1 because the pivot 36 during such swinging of the arm follows an arcuate path while the piston rod 35 moves along a rectilinear path. The cylinder is connected by suitable pipe lines 38 and 39 to a four-way valve 40, the valve in turn being connected by suitable lines to a source of fluid pressure and a sump.

The valve 40 is so arranged that in one position it admits working fluid to the line 38 and vents the line 39 to the sump and in another position connects the line 39 to the source of working fluid and vents the line 38 to the sump. The valve 40 is indicated as any one of the well-known types of four-way valves and is manually operated by a handle 41, but if, as is usual, the bead setting and underply flaring devices are to be operated in timed relation to the drum or other tire forming mechanisms, the valve 40 may be the usual electromagnetic valve controlled by any suitable timing mechanism.

The length of stroke of the cylinder is such that when working pressure is admitted through the line 39 the slides 10 and 23 are moved to an operating position in which the bead setting rings 1 and 14 press the annular beads carried on the shoulders 2 and 15 thereof, respectively, into firm engagement with the underply on the ends of the drum D. When the connections of the cylinder are reversed so as to admit working fluid through the line 38 and vent the line 39, the piston forces the arm 19 in the outboard direction and through the medium of the rack 31, pinion 32 and rack 30, concurrently forces the slide 10 and arm 5 a corresponding distance in the inboard direction away from the end of the drum. This movement continues until the cam follower 25 reaches the sloping portion 27 of the cam track whereupon, due to continued movement of the piston rod 35, the arm 19 is swung in the outboard direction and downwardly, its path of swinging movement being controlled by the cam follower 25 and the cam portion 27. Upon reversal of the supply of pressure fluid when the arms are in this fully retracted position, the arm 19 is first raised into a position in which the ring 14 is coaxial with the drum and then both arms 5 and 19 are moved together toward the opposite ends of the drum, respectively, into operative position.

A suitable stop 42 may be provided for arresting outward movement of the slide 23 when the arm 19 is swung to its pre-selected outermost retracted position.

Due to the provision for movement of the carrier 17 axially of the shaft 18 against the resistance of the spring 20, any slight misadjustment of the position of the drum axially relative to the operating positions of the rings 1 and 14 is compensated for, the spring 20 being sufficiently strong to transmit enough pressure to a bead carried on the shoulder 15 to cause the bead to adhere firmly to the underply on the drum even when the spring is not compressed appreciably.

Thus, a suitable bead setting device is provided by which the annular beads may be applied to opposite ends of the tire carcass on the drum simultaneously and during rotation of the drum and by which the bead setting rings may be withdrawn to retracted position without interrupting the rotation of the drum.

The mechanism described has distinct advantages as a bead setting device separate and apart from the flaring of the underply which may, if desired, be flared in any well known manner.

However, the rotary mounting of the bead setting rings 1 and 14 and the fact that they press the beads against the underply on the ends of the drum with sufficient force to effect the frictional driving relationship between the rings 1 and 14 and the drum are taken advantage of in operating the automatic ply flaring device. Since the ply firing devices are the same in form and function, the ply flaring device associated with the carrier 17 and ring 14 only are described herein in detail and the corresponding parts carried by the ring 1 and carrier 3 are indicated by the same numerals.

Figure 3:
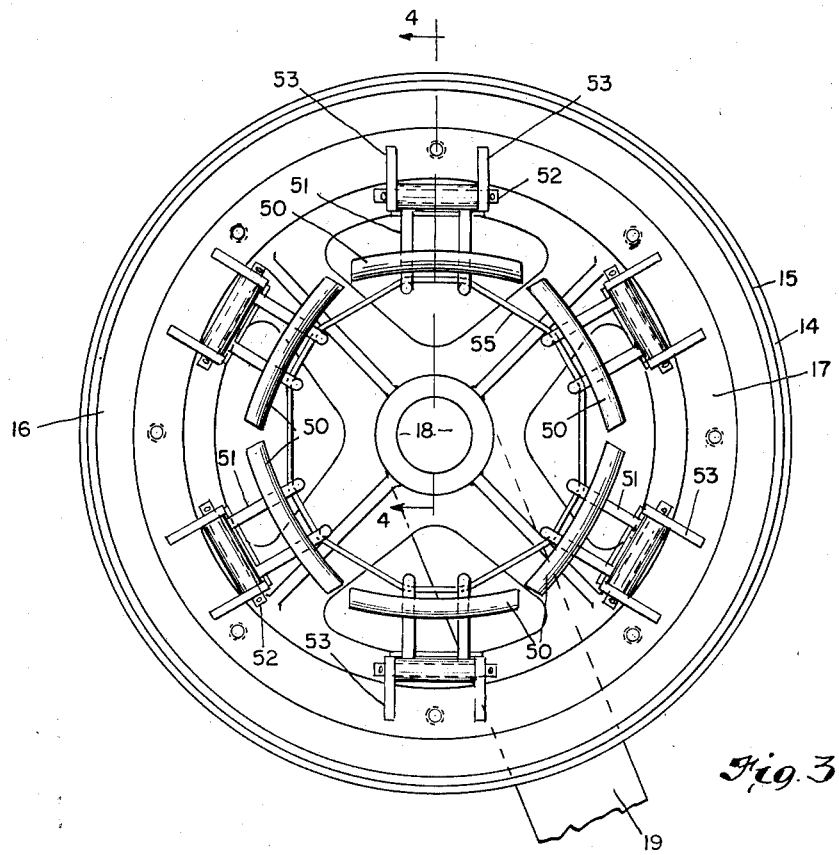
Fig. 3 is an enlarged fragmentary side elevation of the right hand one of the bead setting and underply flaring devices illustrated in Fig. 1 viewed from the left in Fig. 1.
Figure 4:
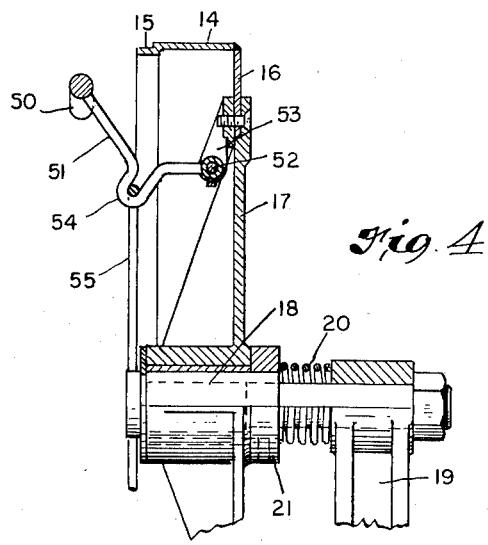
Fig. 4 is an enlarged fragmentary sectional view of the device illustrated in Fig. 3 and as taken on line 4—4 thereof.

Referring particularly to Figs. 3 and 4, the underply flaring device comprises a plurality of arcuate ply engaging shoes 50 which are preferably convex radially outwardly of the drum. Each shoe is mounted terminally on a pair of supporting arms 51, the other ends of which arms are pivotally secured to the carrier 17 by means of chordally arranged pivots 52. Suitable yokes 53 are fixedly secured to the carrier 17 for securing the pivots 52 thereto. Intermediate the shoes 50 and the pivoted ends of the arms 51, the arms are provided with a suitable inwardly extending U-shaped bends 54.

The shoes and their respective supporting arms are spaced equidistantly from each other about the axis of the carrier 17 and the pivots 52 thereof are positioned chordally of the carrier 17. Accordingly, the arms may be swung radially outwardly about the pivots 52 sufficiently to cause the radially outward surfaces of the shoes 50 to move to a fully expanded position which is radially outwardly to or beyond the axially projected outer peripheral surface of the shoulder 15. At the same time, the mounting permits the arms 51 to be swung radially inwardly so as to move the shoes to a radially inward or retracted position which lies within the axially projected interior peripheral surface of the drum.

The shoes 50 are resiliently held in the retracted position and are movable to expanded position by centrifugal force. In the form illustrated, this is accomplished by providing an annular spring, or an annular elastic band 55 of resilient rubber, which is received in all of the bends 54 of all of the arms in embracing relation to the arms as a group, and which is of sufficient strength to hold all of the arms and shoes 50 in the fully retracted position when the carrier 17 is not rotating. The band 55 is so selected relative to the weight of the arms 51 and shoes 50 that upon rotation of the support 17 by and at the rotative speed as the drum, the centrifugal force developed by the shoes and arms overcomes the resistance of the band 55 and causes the shoes to swing radially outwardly to a fully expanded position beyond the axially projected outer peripheral surface of the drum. The centrifulgal force is sufficient to maintain the shoes in this position as the ring 14 is withdrawn from operating position and as its speed decreases. Thus, in operation, as the arms 5 and 19 are moved to position to cause the rings 1 and 14 to press the annular beads carried thereon firmly into contact with the ply on the ends of the drum while the drum is rotating, the shoes 50 pass into the interior of the drum at the opposite ends respectively. Due to the rotative movement imparted to the rings 1 and 14 and their respective carriers 3 and 17 by the frictional engagement between the annular beads and the drum, the shoes 50 swing outwardly generally radially of the drum due to centrifugal force so that the underply flaring device as a whole is centrifugally expanded. This action is almost instantaneous and the shoes engage the inner periphery of the drum and are constrained thereby from further outward movement. As the ring 14 is withdrawn from its operative position relative to the drum, it coasts initially at the same rotative speed as the drum and then at a gradually decreasing speed as the shoes are moved out of the end of the drum and engage the inner peripheral surface of the overhanging underply. Due to the frictional drag of the underply on the shoes and the decrease in rotative speed of shoes relative to that of the drum, there is a corresponding relative rotation between the shoes and the inner surface of the underply. Concurrently the shoes 50 move parallel to the axis of the drum against the underply. As a result of these concurrent movements of the shoes 50, they exert on the underply a wiping action both circumferentially and axially concurrently. At the same time, due to their radial movement, they flare the underply radially outwardly with a wiping action so that it may be engaged readily subsequently by suitable underply turnup tools or mechanisms for folding the underply about the installed annular bead.

It is apparent from the foregoing description that while the bead rings and operating structure may be employed advantageously even without the underply flaring device and the underply flaring and operating structure may be employed advantageously without the bead setting rings, combining the two in the cooperative relation described provides additional advantages and a simplified structure.

Thus, having described our invention, we claim:

1. In a tire building machine including a rotatable forming drum, an underply flaring device which is expansible radially of the drum responsive to rotation of said device, means supporting the device for rotation in coaxial relation to the drum and for movement to and from a position adjacent the end of the drum, said device comprising a carrier providing a driving connection between said drum and device upon movement of the latter to said position whereby to rotate and thus expand said device.

2. In a tire building machine including a rotatable forming drum, an underply flaring device which is expansible radially of the drum responsive to rotation of said device, means supporting the device for rotation in coaxial relation to the drum and for movement to and from a position adjacent the end of the drum, said device comprising a carrier frictionally engaging said drum upon movement of said device to said position whereby to rotate and thus expand said device.

3. In a tire building machine including a rotatable forming drum, an underply flaring device which is expansible and contractible radially of the drum responsive to rotation of said device at predetermined speeds, means supporting the device for rotation in coaxial relation to the drum and for movement to and from a position adjacent the end of the drum, said device comprising a carrier providing a driving connection between said drum and device upon movement of the latter to said position to rotate and thus expand said device, said driving connection being released when the device is withdrawn from said position whereby said device rotates at gradually decrescent speed relative to the drum while the device is being withdrawn from said position.

4. In a tire building machine including a rotatable tire building drum, a normally contracted ply flaring device which is centrifugally expansible by rotation of the device about a predetermined axis, means supporting the device for rotation about said axis and in coaxial relation with the drum, and for movement to and from a position adjacent the end of the drum, and means for rotating the device, said last means comprising a carrier providing a driving connection between said drum and device upon movement of the latter to said position.

5. A ply flaring device for combination with a rotatable tire building drum and comprising a movable support, a carrier rotatable on said support, a flaring element mounted on the carrier for movement toward and away from the axis of rotation thereof by centrifugal force resulting from rotation of the carrier, and a spring element urging the flaring element toward said axis when said carrier is stopped.

6. A ply flaring device for combination with a rotatable tire building drum and comprising a movable support, a carrier rotatable on said support, a flaring element mounted on the carrier for movement toward and away from the axis of rotation thereof by centrifugal force resulting from rotation of the carrier, and a spring element urging the flaring element toward said axis when said carrier is stopped, said carrier being disposed to effect a driving connection of the carrier with a tire drum when the carrier is moved to a predetermined position in axial alignment with the drum.

7. A ply flaring device comprising a support, a carrier rotatably mounted thereon, a plurality of flaring elements pivotally connected to the carrier with their pivotal axes arranged chordally with respect to the rotative axis of the carrier and offset from each other angularly about said axis, a resilient annulus outwardly embodying said elements and resiliently holding the elements in a retracted position relative to the axis of rotation, and driven means connected to the carrier and adapted to be driven for rotating the carrier.

8. A ply flaring device comprising a support, a carrier rotatably mounted theron, flaring elements mounted on the carrier for movement to a retracted position toward, and to an expanded position away from, the axis of rotation of the carrier, a resilient annulus outwardly embodying said elements and operative to hold the elements in the retracted position and to permit movement of the element under predetermined centrifugal force to expanded position, and a bead setting ring coaxial with the carrier and connected to the carrier for rotation therewith about the axis of rotation of the carrier.

9. An underply flaring device for a tire forming drum, said device being expansible and contractible radially of a predetermined axis, means supporting the device for rotation about said axis and for movement generally longitudinally of said axis to and from a predetermined position, means adapted to be driven to rotate the device upon movement of said device to such predetermined position, and said device comprising a flaring element mounted on said device for radial outward movement responsive to rotation of said device.

10. An underply flaring device for a tire forming drum, said device being expansible radially centrifugally upon rotation of the device about a predetermined axis, means to contract the device, means supporting the device for rotation about said axis and for movement generally lengthwise of the axis to and from a predetermined position, and means drivingly connected to the device for rotating the device and adapted to be drivingly engaged by a tire forming drum while the device is in said predetermined position, said device comprising a flaring element mounted on said device for radial outward movement responsive to rotation of said device.

11. An underply flaring device for a tire forming drum, said device comprising a member rotatable about a predetermined axis and operative when so rotated to flare underply on a drum, a support carrying said member for rotation about said axis, and a bead setting ring connected to said member in coaxial relation to said axis for rotation with the member.

12. In a tire building machine including a rotatable drum, an underply flaring element, a carrier supporting the element for rotation in an orbit coaxial with the drum, and for movement generally radially with respect to the axis of rotation to expanded and contracted positions respectively, a spring member normally holding the element in contracted position, a movable support supporting the carrier for movement to and from a position adjacent the end of the drum, said carrier being arranged to be driven by said drum when the carrier is in said position, and said flaring element upon rotation of said carrier as aforesaid moving to expanded position in opposition to the force exerted through said spring member holding said element in contracted position.

13. In a tire building machine including a rotatable drum, a normally contracted ply flaring device which is expansible by centrifugal force generally radially of the drum upon rotation of the device in coaxial relation to the drum, a support member supporting the device for rotation in coaxial relation to the drum and for movement to and from a position adjacent an end of the drum, a spring member operable normally to hold the device in contracted condition and to permit expansion of the device upon said rotation, said device being drivingly engaged with said drum when said device is in said position.

14. In a tire building machine including a rotatable tire building drum adapted to support ply material in overhanging relation to an end of the drum, a ply flaring device which is expansible and contractible radially of the drum, means for holding the device in contracted condition, a support member supporting the device for movement, when the device is in contracted condition, into a position to engage, upon subsequent expansion of the device, the inner periphery of said overhanging ply material, said device being drivingly engaged with said drum while said device is in said position and expanded in response to rotation thereof by said drum.

15. In a tire building machine including a rotatable tire building drum adapted to support ply material in overhanging relation to an end of the drum, a ply flaring device which is expansible and contractible, a reciprocable support member supporting the device for rotation in coaxial relation to the drum and for movement toward and away from the end of the drum, means for expanding and contracting the device respectively, a fluid power device for moving said support member and said device toward the drum when said flaring device is in contracted condition, into a position in which, upon subsequent expansion, it will engage the inner periphery of said overhanging ply, and to withdraw the flaring device from said position, selectively, said flaring device being drivingly engaged with said drum when in said position to be rotated initially at substantially the speed of the drum and released from said drum during its withdrawal from said position and rotated at a gradually reduced speed during its withdrawal.

16. The combination with a rotatable tire forming drum having an open end of centrifugally expansible ply flaring means receivable in the open end of the drum, when unexpanded, and removable therefrom, said ply flaring means and drum being provided with cooperating portions drivingly engaged when the ply flaring means are inserted into the drum for imparting rotation to the ply flaring means sufficient to expand the same.

17. A ply flaring device for a tire forming drum comprising a guideway, slides mounted thereon for movement toward and away from each other, means mechanically interconnecting the slides, and constraining them to predetermined movement relative to each other along the guideway, a fixed supporting arm carried by one slide, a swinging supporting arm carried by the other slide for swinging about an axis extending transversely of the guideway, power means including elements respectively fixed and movable endwise of said guideway, said element which is movable endwise being connected to the swinging arm, means for swinging the said arm toward the fixed arm in a predetermined position of the swinging arm, and tire component manipulating tools carried by the arms and movable into operative position upon movement of said arms toward each other.

18. A device according to claim 17 further characterized in that cam means are provided and control the movement of the swinging arm in predetermined relation to the position of the swinging arm endwise of the guideway.

19. A device according to claim 17 further characterized in that said means interconnecting the slides comprises a gear rack on each slide extending endwise of said guideway, and a gear axially fixed and rotatable on said guideway and in mesh with said racks.

EDWIN E. MALLORY.
JOHN W. WHITE.

REFERENCES CITED

The following references are of record in the file of this patent:

UNITED STATES PATENTS

| Number | Name | Date |
|---|---|---|
| 1,787,411 | Stevens | Dec. 30, 1930 |
| 2,033,896 | Heston | Mar. 10, 1936 |
| 2,313,035 | Breth | Mar. 9, 1943 |